United States Patent
Sunkavalli (10) Patent No.: US 9,892,542 B2
(45) Date of Patent: Feb. 13, 2018

(54) CREATING BUMP AND NORMAL MAPS FROM IMAGES WITH MULTI-SCALE CONTROL

(71) Applicant: Adobe Systems Incorporated, San Jose, CA (US)

(72) Inventor: Kalyan Sunkavalli, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 43 days.

(21) Appl. No.: 14/946,193

(22) Filed: Nov. 19, 2015

(65) Prior Publication Data

US 2017/0148205 A1    May 25, 2017

(51) Int. Cl.
| | |
|---|---|
| *G06T 15/04* | (2011.01) |
| *G06T 3/40* | (2006.01) |
| *G06T 5/20* | (2006.01) |
| *H04N 1/60* | (2006.01) |
| *G09G 5/02* | (2006.01) |

(52) U.S. Cl.
CPC .......... *G06T 15/04* (2013.01); *G06T 2200/24* (2013.01); *G06T 2210/36* (2013.01)

(58) Field of Classification Search
CPC combination set(s) only.
See application file for complete search history.

(56) References Cited

U.S. PATENT DOCUMENTS

| | | | | |
|---|---|---|---|---|
| 2005/0063586 A1* | 3/2005 | Munsil | ............... | H04N 1/4053 382/162 |
| 2006/0197768 A1* | 9/2006 | Van Hook | ............ | G06T 15/005 345/546 |
| 2007/0039706 A1* | 2/2007 | Chen | ................... | G02F 1/1345 162/301 |
| 2008/0297596 A1* | 12/2008 | Inomata | .................. | G06T 5/50 348/80 |
| 2013/0176211 A1* | 7/2013 | Inada | ...................... | G06T 1/60 345/156 |
| 2016/0105677 A1* | 4/2016 | Pomianowski | ........ | H04N 19/46 382/233 |
| 2016/0307482 A1* | 10/2016 | Huang | .................. | G09G 3/002 |

* cited by examiner

*Primary Examiner* — Wesner Sajous
(74) *Attorney, Agent, or Firm* — Kilpatrick Townsend & Stockton LLP (57) ABSTRACT

This disclosure relates to generating a bump map and/or a normal map from an image. For example, a method for generating a bump map includes receiving a texture image and a plurality of user-specified weights. The method further includes deriving a plurality of images from the texture image, the plurality of images vary from one another with respect to resolution or sharpness. The method further includes weighting individual images of the plurality of images according to the user-specified weights. The method further includes generating a bump map using the weighted individual images. The method further includes providing an image for display with texture added to a surface of an object in the image based on the bump map.

20 Claims, 9 Drawing Sheets

CREATING BUMP AND NORMAL MAPS FROM IMAGES WITH MULTI-SCALE CONTROL

TECHNICAL FIELD

This disclosure relates generally to computer-implemented methods and systems that modify images, and more particularly relates to generating a bump map and normal map used to apply texture to a surface of an object in an image.

BACKGROUND

Bump-mapping and normal-mapping are techniques used in computer-based image editing to make a surface of an object in an image look more realistic by simulating small displacements or texture on the surface. Bump-mapping provides a textured appearance of an object in an image using a bump map that is generally manually created by a user. A bump map provides pixel depth values that are used to modify surface normals of an object (e.g., a sphere) to add lighting effects. The lighting effects give the appearance of texture on the surface of the object. A normal map serves a similar function, but unlike a bump map that generally uses grayscale values to provide pixel depth values, a normal map provides RGB information (e.g., an orientation) for each surface normal of the model object. The orientation of a point corresponds directly with an X, Y, and Z axis in three-dimensional (3D) space. Thus, normal maps indicate an orientation of the surface normal, allowing a 3D application to shade the object appropriately.

Traditional techniques require a user to define bump and/or normal maps by hand, which can be costly, time-consuming, and require the user to have special skills. In contrast, automated techniques that have attempted to create a bump map and/or a normal map from a texture depicted in another image have failed to provide bump/normal maps that accurately convey the desired texture and have failed to offer sufficient user control over the appearance of the created map. Users have thus been left to choose between the options of painstakingly creating bump/normal maps manually or settling for automatically created bump/normal maps that often fail to provide the desired appearance.

SUMMARY

According to certain embodiments, systems and methods are disclosed for generating a bump map and normal map from an image. These embodiments enable bump map and/or normal map generation from an image that includes a texture. At least one embodiment provides user control over the generated map by utilizing user-specified weights.

In some embodiments, a method for generating a bump map includes receiving a texture image and multiple user-specified weights. Multiple images are derived from the texture image, the multiple images varying from one another with respect to resolution and/or sharpness. The method further includes weighting individual images of the multiple images according to the user-specified weights. A bump map is generated using the weighted images. An image is provided for display with texture added to an object in the image based on the bump map values. In some embodiments, a normal map is constructed from the bump map by deriving horizontal and vertical gradients from the bump map values. The bump map values and the horizontal and vertical gradients specify the RGB information necessary to define the normal map.

In accordance with at least one embodiment, another method for generating a bump map includes receiving a texture image. A shading image is derived using the texture image. For example, a shading image is derived from the texture image by converting the texture image to a lab color space format. A bump map is generated based on the shading image and an image is provided for display based on the bump map. In some embodiments, a normal map is constructed from the bump map by deriving horizontal and vertical gradients from the bump map values. The bump map values and the horizontal and vertical gradients specify the RGB information necessary to define the normal map. The image is provided for display with texture added to an object in the image based on the normal map.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

Features, embodiments, and advantages of the present disclosure are better understood when the following Detailed Description is read with reference to the accompanying drawings, where.

DETAILED DESCRIPTION

According to certain embodiments, systems and methods are disclosed for generating a bump map and a normal map from an image to apply a texture to a surface of an object in a different image. As used herein, the phrase "bump map" refers to information that includes pixel depth values that are used to modify surface normals of an object to apply the appearance of texture to the object. As used herein, the phrase "normal map" refers to information that provides orientations for surface normals that are used to shade an object to apply the appearance of texture to the object. As discussed above, existing techniques, such as manual bump map creation require time and skill which may lead to undesirable textures. Automated techniques that have attempted to create a bump map and/or a normal map from a texture image fail to provide sufficient user control over the resultant bump map.

As used herein, the phrase "texture image" refers to an image that depicts a surface that is not smooth in one or more places or that otherwise depicts a 3 Dimensional (3D) characteristic of the surface. Examples of non-smooth surfaces having texture include, but are not limited to, any surfaces having ridges, wrinkles, dimples, protrusions, 3D patterns, or other 3D features. Examples of texture images include, but are not limited to, images of water, turf, grass, trees, rocks, cloth, skin, flames, and any other 3D surface that is not entirely smooth.

A first aspect of the techniques described herein allows a user to control the appearance of the bump map with minimal manual user input. Specifically, a bump map is created using different resolution input images that are derived from a user-identified texture image. The different resolution input images are used to generate the bump map. The user is able to control the relative influence of the different resolution input images by adjusting only a few simple parameters. By controlling the relative influence of the different resolution input images, the user is able to vary the appearance of the generated bump map. A second aspect of the techniques disclosed herein improves the accuracy of a bump map by creating the bump map based on a shading image that is derived from the texture image. The shading image is derived by removing random variations of brightness or color (e.g., noise) from the texture image. The removal of these variations produce more accurate bump maps. The user control and shading image aspects of the described techniques can be used individually or together to provide significant benefits over the prior techniques. In some embodiments, a normal map is generated from the bump map and used to apply texture to the image.

In at least one embodiment, a number of user-defined weights are utilized to produce a bump map and a normal map. In a non-limiting example, a user selects a texture image with which to emulate a texture (e.g., a picture of a bed of rocks). The user may additionally select a number of user-defined weights corresponding to a high frequency detail, a medium frequency detail, and a low frequency detail. The texture image is converted to a lab color space format to separate the color components and the luminance component of the image.

As used herein the phrase "lab color space format" refers to a color format that uses three coordinates that represent the tones and colors of an image in a three-dimensional space. A significant benefit to specifying an image in lab color space format is that luminance (tone) and color of the image are represented by separate coordinates. Accordingly, a luminance coordinate of the image may be adjusted independently from a color coordinate of the image, and vice versa. An example of a lab color space includes, but is not limited to, the Hunter 1948 color space. The Hunter 1948 color space is a three-dimensional real number space, that contains infinite possible representations of colors. The Hunter 1948 color space includes a luminance coordinate L and color coordinates a and b, all of which are based on nonlinearly compressed coordinates. The luminance coordinate, L, represents the darkest black when L=0, and the brightest white at L=100. The color coordinates, a and b, will represent true neutral gray values at a=0 and b=0. The red/green colors are represented along the a axis, with green at negative a values and red at positive a values. The yellow/blue colors are represented along the b axis, with blue at negative b values and yellow at positive b values. The scaling and limits of the a and b axes will depend on the specific the color space being used, but they often fall in the range of ±100 or −128 to +127.

Continuing on with the example above, the luminance coordinate of the texture image is identified by reformatting the texture image to the lab color space format. The luminance coordinate defines the shading image. Alternatively, the shading image can be identified by using an intrinsic images algorithm to generate an estimation that is used as the shading image. After the shading image is identified, a Gaussian filter (using a standard deviation) is used to remove noise from the shading image. The shading image is then used to create two additional images at different levels of resolution so that three different frequency images are available (i.e., a high frequency, a medium frequency, and a low frequency). The two additional images are derived using another Gaussian filter, for example, to generate a Gaussian pyramid. The images relate to one another in that they are the shading image at different resolutions and levels of detail (e.g., sharpness). In this example, the original shading image is on the first level, a second image (½ the size of the original image, and less detailed) is on a second level, and a third image (½ the size of the second image, and less detailed than the second image) is on a third level. Once the three images are defined, the corresponding image maps are weighted according to the user-defined weights. In this example, each image is rescaled so that the images are back to the original size and the weighted image maps are added together to determine the bump map. A normal map is derived from the bump map by determining the horizontal and vertical gradients of the bump map.

Several benefits are realized by utilizing the process described above, although the following benefits are not intended to be an exhaustive list. For example, separating the color coordinates from the texture image to identify the shading image allows the texture features of the shading image to be determined more accurately. This is because the color coordinates of the texture image can obscure some of the features of the image (e.g., create noise). Thus, using the shading image allows textures features of the texture image to be more easily and more accurately identifiable. In some examples, the Gaussian pyramid enables the user-specified weights to be assigned to particular frequencies of the image (e.g., high level frequencies, medium level frequencies, low level frequencies, etc.). In essence, assigning a user-specified weight to each level of the Gaussian pyramid (and the corresponding image associated with the level) advantageously enables the user to control which details and how much such details affect the bump map that is generated. For example, if the user wants high level frequency image characteristics to be more prominent in the texture defined by the bump map, the user need only increase the corresponding user-specified weight. Accordingly, the systems and methods provided herein provide a user-friendly interface that provides the ability to control what details from a texture image are prominent in the generated bump map.

Figure 1:
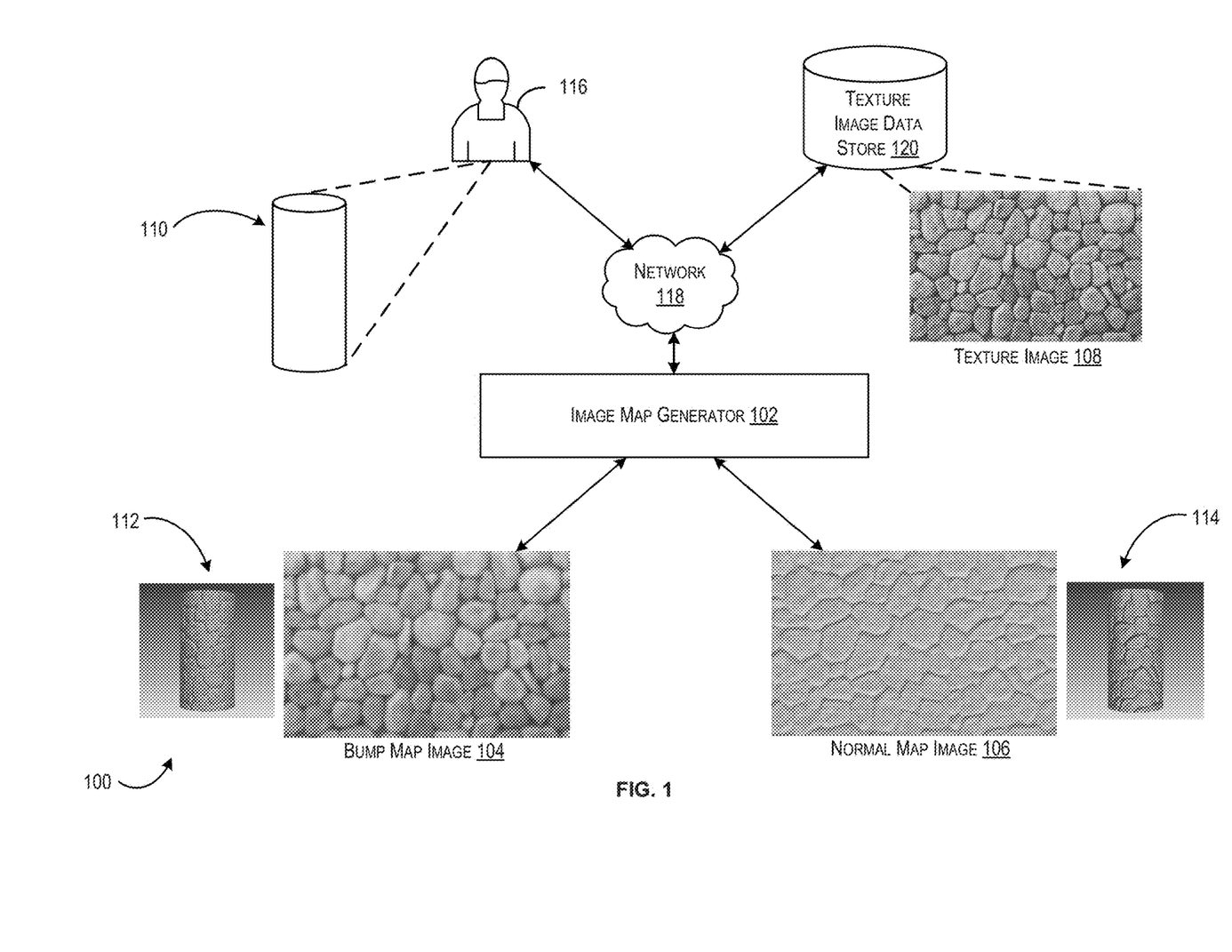
FIG. 1 is a block diagram depicting an example of an image map generator that generates a bump map and a normal map based on a texture image, according to certain exemplary embodiments.

Referring now to the drawings, FIG. 1 is a block diagram 100 depicting an example of an image map generator 102 that generates a bump map 104 and a normal map 106 based on a texture image 108. The bump map 104 and/or the normal map 106 are used to provide texture to a 3D model 110, as depicted at 112 and 114, respectively.

In some embodiments, the image map generator 102 obtains identification of the texture image 108 from a user 116 via network 118. The network 118 (and any network described herein) includes any appropriate set of communicatively-coupled computing devices and equipment that electronically transmit and receive data. Examples of the network 118 include (but are not limited to) an intranet, the Internet, a cellular network, a local area network, a wide area network, or any other such network or combination thereof. Although FIG. 1 depicts the user 116 interacting with the image map generator 102 via the network 118, it should be appreciated that this is non-limiting in nature. In some examples, the user 116 directly communicates with the image map generator 102 (e.g., operating on a desktop computer of the user 116) without the use of the network 118.

In some embodiments, the image map generator 102 (or another application that includes or communicates with the image map generator 102) provides the user 116 with an interface with which to specify the 3D model 110 and the texture image 108. In some examples, the interface is utilized to peruse a texture image data store 120 (e.g., a data store responsible for maintaining one or more texture images). Alternatively, the interface enables the user 116 to specify a locally-stored image for the texture image.

In at least one non-limiting example, the image map generator 102 receives user input specifying a number of weights corresponding to a frequency of the texture image 108 (e.g., a high frequency, a medium frequency, and/or a low frequency). As used herein, a "frequency" of an image is intended to refer to an amount of detail included in a given area of an image. This is measured by the amount of tonal variation between rows or columns of pixels. In images with high frequency, a great deal of variation exists between measurements. High variation indicates that, for example, there is a high number of lines, a large number of textures, and/or a large degree of contrast in a given area of the image. Thus, high frequencies in an image will contain information about fine details. In images with medium frequencies, a modest amount of variation between measurements exists, indicating clear contours with moderate to low amounts of texture. In images with low frequencies, very little variation exists between measurement, characterized by smooth, long gradations, often with reduced contrast or flat fields of color. Thus, low frequencies in the image contain information related to volume, tone, and color transitions. In at least one example, the image map generator 102 utilizes the user-specified weights to control the influence each type of frequency has with respect to a generated bump map.

In exemplary embodiments, the image map generator 102 derives a shading image from the texture image 108. As discussed above, the shading image can be derived by isolating a shading component of the texture image. Alternatively, the shading image can be estimated using an intrinsic images algorithm. By isolating or estimating the shading image, noise from random color variations of the textured image can be discarded. Thus, the image map generator 102 can more accurately generate a bump map because variations corresponding to changes in color will not be considered.

The image map generator 102 utilizes the user-specified weights and/or the shading of the texture image 108 to generate the bump map 104. The image map generator 102 derives horizontal and vertical gradients of the bump map 104 to generate the normal map 106. The image map generator 102 maps the bump map 104 onto the surface of the 3D model 110. Mapping the bump map onto the surface produces the surface texture depicted at 112. Similarly, the image map generator 102 can map the normal map 106 to the 3D model 110, to produce the surface texture depicted at 114.

Figure 2:
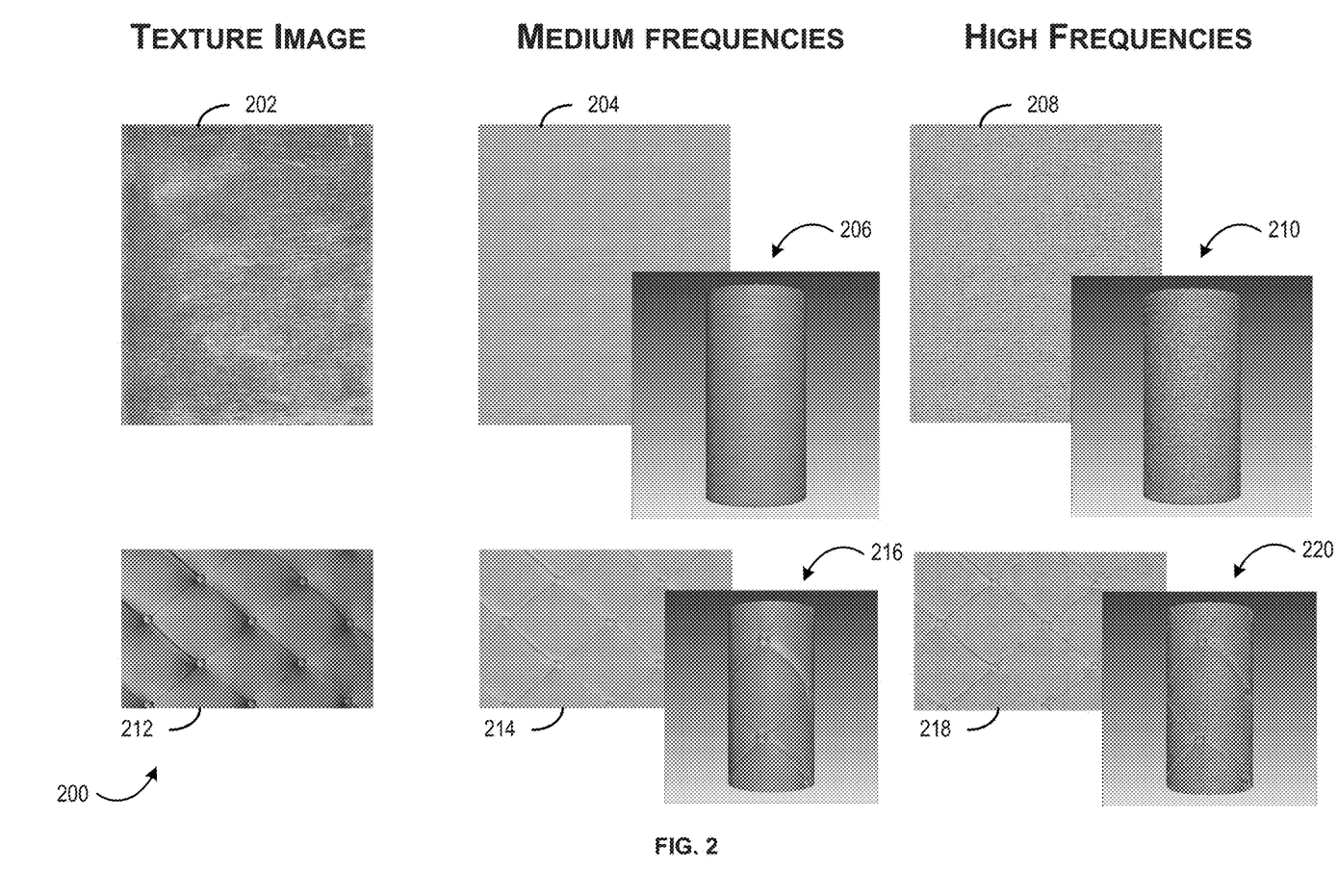
FIG. 2 is a diagram depicting multiple example texture images, bump maps, and normal maps, according to certain exemplary embodiments.

FIG. 2 is a diagram 200 depicting examples of multiple images having medium and high frequency components, according to certain exemplary embodiments. Texture image 202 depicts a metal surface that includes a number of textures. For example, scratches of various depths and widths can be seen. Image 204 depicts a normal map of the medium frequency components of the texture image 202. The image 204 depicts various bumps and divots in the metal, but little of the scratches seen in the texture image 202. The image 204, when applied to the 3D model 110 of FIG. 1 produces the surface texture depicted at 206. Image 208 depicts a normal map of the high frequency components of the texture image 202. The image 208 depicts finer details than the image 204 including more of the scratches of the texture image 202 and very little of the bumps and divots of the image 204. The image 208, when applied to the 3D model 110 of FIG. 1 produces the surface texture depicted at 210.

As a further example, texture image 212 depicts an upholstered leather surface that includes buttons that depress the leather. Image 214 depicts a normal map of the medium frequency components of the texture image 212. The image 214 depicts the depressions and mounds of the leather, while at the same time depicting the leather as a relatively smooth surface. The image 214, when applied to the 3D model 110 of FIG. 1 produces the surface texture depicted at 216. Image 215 depicts a normal map of the high frequency components of the texture image 212. The image 218 depicts finer details of the texture image 212 such as the actual grain of the leather. The image 218 shows less of the depressions and mounds that appear in the image 214. The image 218, when applied to the 3D model 110 of FIG. 1, produces the surface texture depicted at 220.

Figure 3:
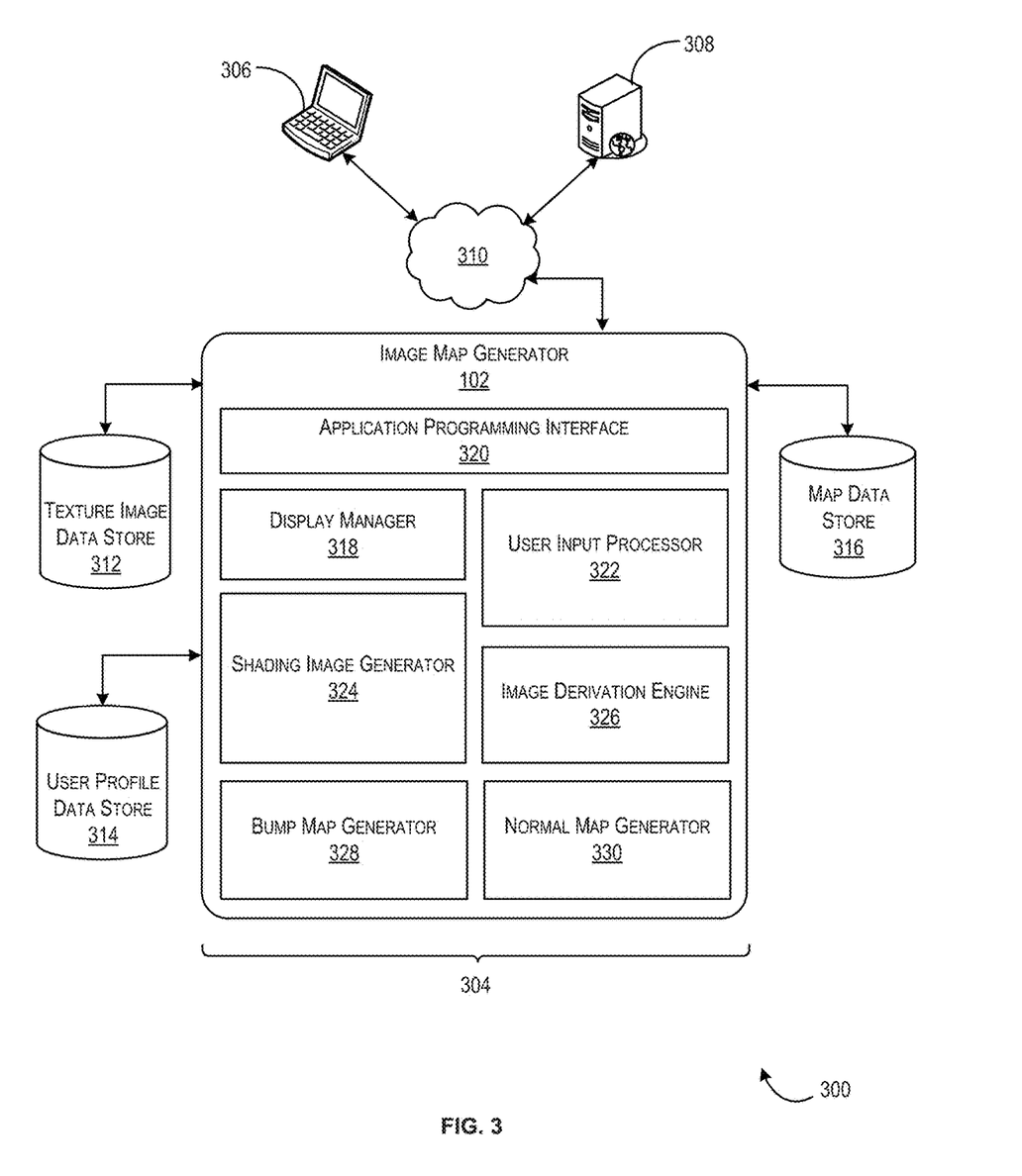
FIG. 3 is an example computer architecture of the image map generator, including a plurality of modules that are utilized to provide various aspects of the image map generator, according to certain exemplary embodiments.

FIG. 3 is an example computer architecture 300 of the image map generator 102 of FIG. 1, including a plurality of modules that are utilized to provide various aspects of the image map generator 102, according to certain exemplary embodiments. The modules 304 are software modules, hardware modules, or a combination thereof. In some examples, the modules 304 are embodied on a computer readable medium and processed by a processor in any of the computer systems described herein. In some embodiments, any module or data store described herein are a service responsible for managing data of the type required to make corresponding calculations. The modules 304 are configured in the manner suggested in FIG. 3 or the modules 304 are configured in a different configuration. Alternatively, the modules are external to the image map generator 102. In some examples, at least one of modules 304 is executed, in whole or in part, on user device 306 (e.g., a laptop) as part of an application executing on user device 306 (e.g., an image-editing application). Likewise, in some examples, a portion of the modules 304 are executed on remote computing device 308 (e.g., a server). The user device 306 and/or the remote computing device 308 interact with the image map generator 102 via network 310 (e.g., the network 118 of FIG.

1). Alternatively, the user device 306 communicates with the image map generator 102 without using the network 310.

In the embodiment shown in FIG. 3, a texture image data store 312, a user profile data store 314, and a map data store 316 are shown. It should be understood that data can be otherwise maintained, derived, or accessed from various data stores. Such data stores are either remote or local to the image map generator 102. A combination of the data stores depicted in FIG. 3 are located on the remote computing device 308 and/or are located on the user device(s) 306. The image map generator 102 includes various modules such as display manager 318, an application programming interface 320, a user input processor 322, a shading image generator 324, an image derivation engine 326, a bump map generator 328, and a normal map generator 330. In some examples, the modules 304 are combined in any suitable combination. Some functions of the modules 318, 320, 322, 324, 326, 328, and 330 are described below. However, for the benefit of the reader, a brief, non-limiting description of each of the modules is provided in the following paragraphs.

In accordance with at least one embodiment, the display manager 318 provides a graphical interface to be presented on user device 306. The graphical interface provides various interface elements for collecting user input (e.g., check boxes, edit boxes, radio buttons, drop down menus, etc.). In some examples, the graphical interface provides histograms or other graphs depicting various aspects of a bump/normal map. In still further examples, the graphical interface provides a preview of an object depicting an applied texture. The display manager 318 utilizes generated bump maps and/or normal maps to depict a texture the object (e.g., the 3D model 110 of FIG. 1) and present the image of the textured object to the user via user device 306.

The application programming interface 320 is utilized by the image map generator 102 to receive and/or transmit any suitable information, for example, between the image map generator 102 and the user device 306 via the network 310. Additionally, or alternatively, the application programming interface 320 is utilized to receive and/or transmit any suitable information between the remote computing device 308 and the image map generator 102.

In at least one embodiment, the user input processor 322 is configured to receive user input (e.g., an identification of a texture image or a texture image, various user weights and settings) and store such input. In some examples, the user input processor 322 stores input in user profile data store 314. In at least one example, user input is stored in a record associated with the user (e.g., a user profile) to be recalled at a later time. As a non-limiting example, a graphical interface provided by display manager 318 is utilized to provide a user with the ability to specify various user inputs. User inputs include a blur, a scaling of the texture image, a high frequency setting, a medium frequency setting, a low frequency setting, a height inversion setting, or the like. The graphical interface is further utilized to provide a user with the ability to define a set of preset values for bump map generation. For example, in at least one example, the provided user inputs are associated with a preset such as "metal." In some cases, rather than manually reentering each input, the user may simply select a "metal" preset and the corresponding set of user input values are retrieved from the user profile data store 314 to populate the appropriate fields in the graphical interface. In some examples, such presets are created by users in a community and shared with other users by the image map generator 102. Additionally, a texture image is identified using received user input. The texture image is retrieved by the user input processor 322 from the texture image data store 312. Additionally, or alternatively, the image map generator 102 analyzes the texture image provided to the user input processor 322. The image map generator 102 determines a similarity threshold (using image recognition techniques) to other texture images already submitted (e.g., images submitted by the user or other users of the image map generator 102). If a substantially similar texture image is determined, the image map generator 102 provides suggested weights to a user based on weights used in the similar texture image.

For example, the user submits a texture image having details including a metallic surface. One or more similar images is identified by the user input processor 322 from submissions of the user or of other users. In some examples, the similar images include metallic surfaces. The user input processor 322 determines a particular image is the most similar to the submitted texture image and provides the user with image weights from the particular image. In another example, the user input processor 322 computes an average for each weight using all of the similar images identified, and provides the average value for each weight to the user as a set of suggested weights. The graphical interface provided by the image map generator 102 is utilized to provide and apply the set of the suggested weights.

The shading image generator 324, a component of the image map generator 102, is used to separate the color coordinates and the shading coordinates of a texture image. In some examples, such separation is performed by the shading image generator 324 to convert the texture image to lab color space (e.g., a CIELAB color space) format. CIELAB format includes three coordinates, L, a, and b corresponding to each pixel of the texture image. The L coordinate, also referred to as a luminance coordinate, represents the lightness of the color at the pixel where L=0 yields black and L=100 indicates white. The a coordinate indicates a position between red and green at the pixel where negative values of a indicate green while positive values of a indicate red. The b coordinate indicates a position between yellow and b at the pixel where negative values of b indicate blue and positive values of b indicate yellow. The shading image generator 324 discards, as an example, the a and b coordinates to provide a shading image that includes only the L coordinate of the pixels. Alternatively, the shading image generator 324 utilizes an intrinsic image decomposition algorithm to estimate the shading image of the texture image. An intrinsic image decomposition algorithm (e.g., the Retinex algorithm) classifies each image gradient of the texture image as belonging to either a reflectance layer or a shading layer according to its magnitude. Once classification of the image gradients is performed, the shading image generator 324 utilizes the shading layer to estimate the values for the shading image.

In at least one embodiment, the shading image generator 324 suppresses any potential noise in the shading image by utilizing a filter to construct a denoised luminance coordinate. For example, a Gaussian filter with standard deviation $\sigma_n$ is utilized to construct the denoised luminance coordinate. In practice, $\sigma_n$ is typically set to 0.5, though any suitable value may be utilized. The shading image generator 324 normalizes the shading image in order to construct a normalized shading image. For example, a normalized shading, $\hat{L}$, that lies between 0 and 1 is computed with the following equation:

$$\hat{L} = \frac{L - \max(L)}{\max(\max(L) - \min(L), \epsilon)},$$

where ϵ make normalization robust to low-contrast images. This normalization makes the bump and normal map construction invariant to the average brightness and contract of the texture image and ensures that the shading spans the entire dynamic range.

Figure 4:
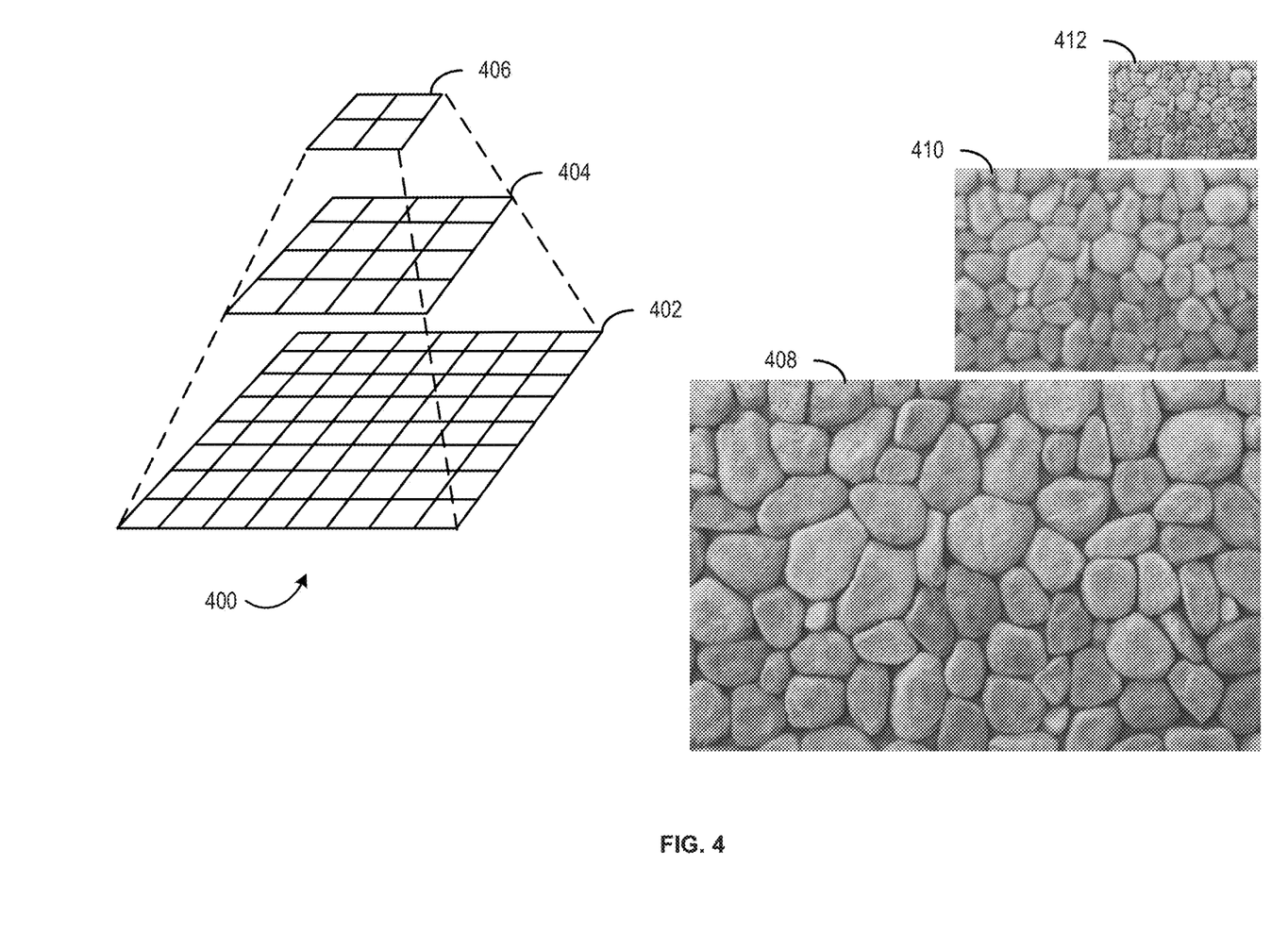
FIG. 4 is a diagram depicting an example three-level image pyramid in which images of different sizes and resolutions are generated by the image map generator, according to certain exemplary embodiments.

In accordance with at least one embodiment, the image derivation engine 326 can utilize the normalized shading image to construct a n-level Gaussian pyramid (or an n-level Laplacian pyramid). Pyramid representation of an image is a type of multi-scale signal representation in which a signal or an image is subject to repeated smoothing and subsampling. FIG. 4 depicts an example three-level Gaussian pyramid 400 in which images of different sizes and resolutions are generated by the image derivation engine 326. As depicted in FIG. 4, a three-level Gaussian pyramid 400 includes a first level 402, a second level 404, and a third level 406. The first level 402 corresponds to a shading image 408 (e.g., the normalized shading image determined by the shading image generator 324). The second level 404 of the Gaussian pyramid corresponds to shading image 408, which is ½ the size of the shading image 408, and less detailed than the shading image 408. The third level 406 of the Gaussian pyramid corresponds to shading image 412 which is ½ the size of the shading image 410, and less detailed than the shading image 410. The Gaussian pyramid includes any suitable number of levels. The use of three levels is intended merely as an example.

Returning to FIG. 3, image derivation engine 326 sets the first level $P_1 = \hat{L}$. Each subsequent level is constructed by filtering the image from the previous level with a Gaussian filter with standard deviation, $\sigma_P$, and down-sampling the previous image by a factor of s according to the following equation:

$$P_k = \downarrow_s P_{k-1} * N(\sigma_P)$$

Here, * denotes the convolution of a pyramid level with a Gaussian filter, k denotes the current level, and $\downarrow$s denotes down-sampling by a factor of s. Performing this operation n times provides an n-level Gaussian pyramid. Alternatively, the image derivation engine 326 constructs a Laplacian pyramid in a similar manner using a Laplacian transform rather than a Gaussian filter. Regardless, each image corresponding to a level of the pyramid captures different scales of the details of the shading image. An image at the lowest level of the pyramid (e.g., the third level 406 of FIG. 4) captures only the low frequency information of the shading image. An image at the middle level of the pyramid (e.g., the second level 404 of FIG. 4) captures the shading details across the mid and high frequencies. An image at the highest level of the pyramid (e.g., the first level 402 of FIG. 4, corresponding to the original shading image), captures shading details across the low, mid, and high frequencies. $\sigma_P$ controls the frequency of details of each image at each level of the pyramid.

In accordance with at least one embodiment, the bump map generator 328 constructs a bump map by adding together the pixel values from the images of the Gaussian pyramid. In at least one example, the received user inputs, specifically user-specified weights corresponding to the low frequency setting, the medium frequency setting, and the high frequency setting are used to scale the influence of each image of the Gaussian pyramid with respect to the resultant bump map. The user-specified weights are accounted for with the following equation:

$$B(p, q) = \frac{1}{\sum_k w_k s^k} \sum_k w_k s^k P_k(p, q)$$

Where $w_k$ denotes the per-scale weighting specified by the user and s is the down-sampling factor used to iteratively construct each level of the pyramid. By manipulating the weights, the user can control the multi-scale detail in the final bump map. High weights for coarser scales (corresponding to the medium and low frequency settings) produce a bump map corresponding to a blurred image. A high weight for the finer scale (corresponding to the high frequency setting) produces a bump map in which finer details of the texture are preserved. In at least one example, the bump map generator 328 stores the constructed bump map in map data store 316, a storage location suitable to store such information.

In accordance with at least one embodiment, the normal map generator 330, a component of the image map generator 102, is configured to construct a normal map from a bump map. In at least one example, the normal map generator 330 computes horizontal and vertical gradients of the bump map to construct a normal map N, at pixel (p, q) using the following central differences equation:

$$N(p, q) = [n_x \ n_y \ n_z]$$

$$= \left[\frac{dB}{dx} \frac{dB}{dy} 1\right] / \sqrt{\frac{dB^2}{dx} + \frac{dB^2}{dy} + 1}.$$

$$\frac{dB}{dx} = B(p-1, q) - B(p+1, q)$$

$$\frac{dB}{dy} = B(p, q-1) - B(p, q+1).$$

In at least one example, the normal map generator 330 stores the constructed normal map in map data store 316.

Figure 5:
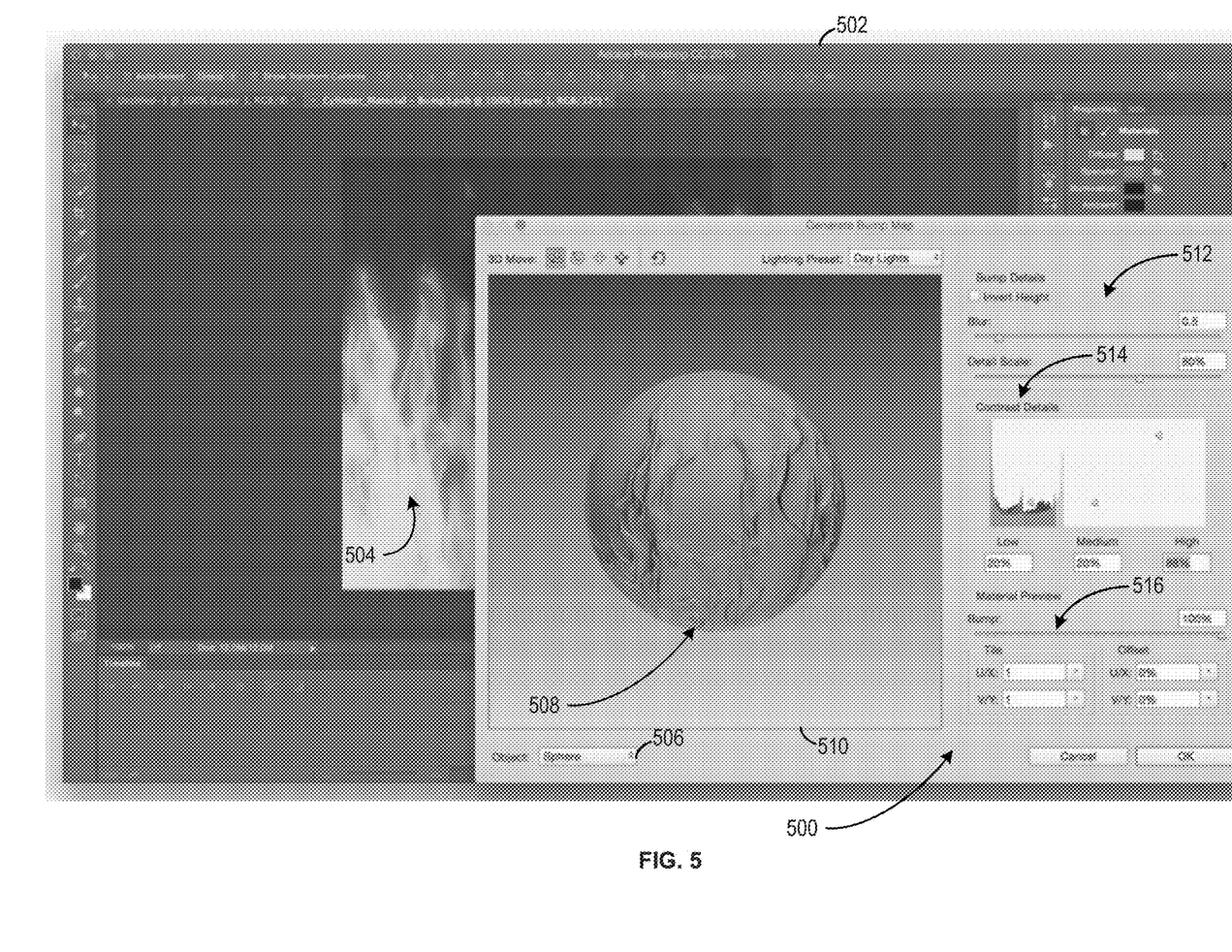
FIG. 5 is a diagram depicting an example of an interface for obtaining, by the image map generator, user inputs related to generating a bump map, according to certain exemplary embodiments.

FIG. 5 is a diagram depicting an example of an interface 500 for obtaining, by the image map generator 102 of FIG. 1, user inputs related to generating a bump map, according to certain exemplary embodiments. It should be appreciated that FIG. 5 is intended merely to give an example interface, any suitable interface for obtaining the discussed inputs may be utilized. In some embodiments, the interface 500 is provided as part of an image-editing application 502. Within the image-editing application 502, the user selects a texture image 504 (e.g., a texture image including flames). Upon selection a "generate bump map" option, for example, the image map generator 102 provides the user with interface 500. The interface 500 provides the user a mechanism for selecting a 3D object. In at least one example, the user selects the object via a menu such as menu 506. For example, upon selecting "sphere" from the menu 506, a sphere 508 appears in preview window 510 (although a preview window does not necessary need to be utilized).

In at least one example, the interface 500 includes a section for defining bump details (e.g., bump map details section 512). For example, a user utilizes the bump details section to specify whether or not the heights included in the resultant bump map should be inverted. In this manner, the user causes the bump map to generate textures appearing to push out from the 3D object (e.g., the sphere 508) or, instead, textures that appear to push into the 3D object. In the example depicted in FIG. 5, the texture (e.g., the flames) push out from the 3D object. The bump details section 512 of the interface 500 further includes sliders, or other suitable graphical elements, that are manipulated by the user to specify a value corresponding to a blur to be applied to the texture image. The specified blur value is utilized by, for example the user input processor 322 of FIG. 3, to blur the texture image prior to the texture image being utilized for any further calculations. Additionally, the bump details section 512 further includes sliders, or other suitable graphical elements, that are manipulated by the user to specify a scaling value for the texture image. The specified scaling value is utilized by, for example, the user input processor 322 to scale the texture image prior to the texture image being used in any further calculations.

In at least one embodiment, the interface 500 includes a contrast details section 514 for specifying a low frequency setting, a medium frequency setting, and/or a high frequency setting. In some examples, once a bump map has been generated for the texture image using the methods discussed herein, a graphical representation of bump map data (e.g., a histogram) is displayed. In FIG. 5, a histogram is used for illustrative purposes, any suitable graphical representation can be utilized to provide information related to the bump map.

In at least one example, the generated bump map is fitted on the sphere 508 (e.g., by the display manager 318 of FIG. 3). The user then manipulates the position of the bump map with respect to the sphere 508. In some examples, the user manipulates the position of the bump map utilizing a material preview section 516 of the interface 500. The material preview section 516 is utilized to provide a value corresponding to a degree of projection corresponding to the bump map with respect to the surface of the sphere 508. Higher values cause the texture depicted using the bump map (in this example, the flames) to appear to protrude further out of the sphere than lower values. The material preview section 516 is utilized to provide an x and y coordinate that specify how the bump map is stretched or tiled to fit the sphere 508. The material preview section 516 is further utilized to provide an x and y offset. The x and y offset are utilized to shift the texture image depicted using the bump map vertically on the sphere 508.

Figure 6:
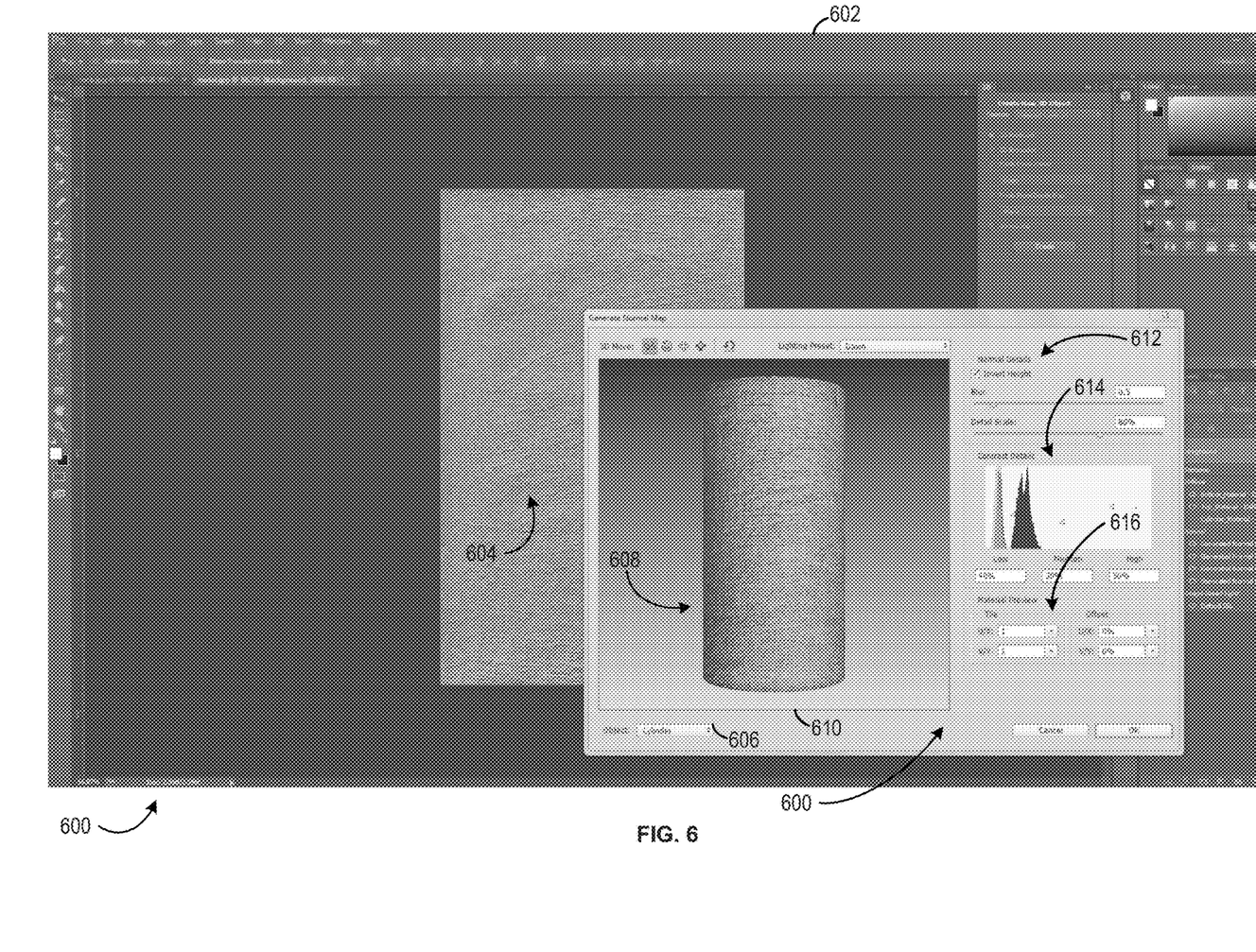
FIG. 6 is a diagram depicting an example of an interface for obtaining, by the image map generator, user inputs related to generating a normal map, according to certain exemplary embodiments.

FIG. 6 is a diagram depicting an example of an interface 600 for obtaining, by the image map generator 102 of FIG. 1, user inputs related to generating a normal map, according to certain exemplary embodiments. It should be appreciated that FIG. 6 is intended merely to give an example interface, any suitable interface for obtaining the discussed inputs may be utilized. In some embodiments, the interface 600 is provided as part of an image-editing application 602 (e.g., the image-editing application 502). For example, a user can select a texture image 604 (e.g., a texture image including scratches and bumps). Upon selection a "generate normal map" option, for example, the image map generator 102 causes the user to be provided with interface 600. The interface 600 provides a mechanism for selecting a 3D object such as a menu 606. In this example, upon selecting "cylinder" from the menu 606, a cylinder 608 appears in preview window 610 (although a preview window does not necessary need to be utilized).

In at least one example, the interface 600 includes a section for defining normal (map) details (e.g., normal map details section 612). The normal details section 612 is used to specify whether (or not) the normal map should be depicted as pushing into the cylinder 608 as depicted in the figure. The normal map details section 612 further includes sliders, or other suitable graphical elements, that are utilized by the user to specify a value corresponding to a blur to be applied to the texture image. The specified blur value can be utilized by the user input processor 322 of FIG. 3 in a similar manner as described above in connection with FIG. 5. Additionally, the normal map details section 612 further includes sliders, or other suitable graphical elements, that are utilized by the user to specify a scaling value for the texture image. The specified scaling value can be utilized by the user input processor 322 of FIG. 3 in a similar manner as described above in connection with FIG. 5.

In at least one embodiment, the interface 600 includes a contrast details section 614 for specifying a low frequency setting, a medium frequency setting, and/or a high frequency setting. Once a bump map has been generated for the texture image using the methods discussed herein, a graphical representation of normal map data (e.g., a histogram) is displayed. In FIG. 6, a histogram is used for illustrative purposes, any suitable graphical representation can be utilized to provide information related to the bump map.

In at least one example, the generated normal map is fitted on the cylinder 608 (e.g., by the display manager 318 of FIG. 3). A material preview section 616 of the interface 600 is utilized to manipulate the position of the normal map with respect to the cylinder 608. The material preview section 616 is utilized to provide a value corresponding to a degree of projection corresponding to the normal map with respect to the surface of the cylinder 608. Higher values cause scratches in the texture depicted in FIG. 6 to appear deeper than if lower values were specified. The material preview section 616 is utilized to provide an x and y coordinate that specify how the normal map is stretched or tiled to fit the cylinder 608. The material preview section 516 is further utilized to provide an x and y offset. The x and y offset are utilized to shift the texture image depicted using the bump map vertically on the cylinder 608.

Figure 7:
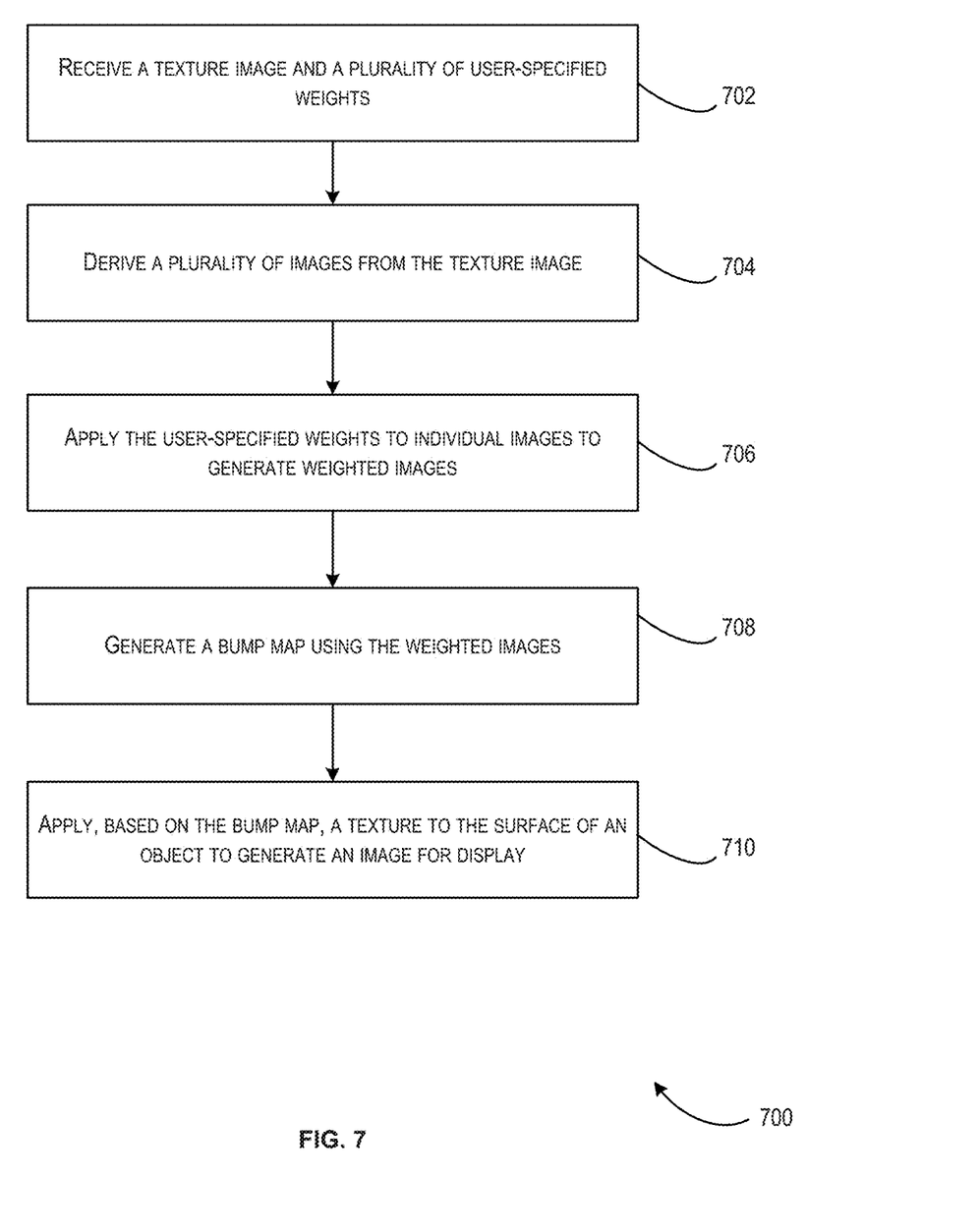
FIG. 7 is a flow chart depicting an example of an algorithm for generating a bump map using user-specified weights, according to certain exemplary embodiments.

FIG. 7 is a flow chart depicting an example of an algorithm 700 for generating a bump map using user-specified weights, according to certain exemplary embodiments. In some embodiments, the operations depicted in FIG. 7 are implemented by using one or more processing devices to execute suitable program code. The program code includes the image map generator 102 and is thereby configured to perform the operations described herein. For illustrative purposes, the algorithm 700 is described using the implementations described above with respect to FIGS. 1-6. Other implementations, however, are possible.

At block 702, the image map generator 102 receives a texture image and a plurality of user-specified weights. For example, the texture image includes the texture image 504 (flames) depicted in FIG. 5 or the texture image 604 of FIG. 6, although the texture image may be any suitable image. The texture image is stored (e.g., within the texture image data store 312 of FIG. 3) as part of a catalog of images. Alternatively, the texture image is locally stored on a user device.

In some embodiments, the image map generator 102 (e.g., the user input processor 322 of FIG. 3) receives the texture image with data that has been transmitted to a system executing the image map generator 102 via a network 118 of FIG. 1. Additionally, the image map generator 102 (e.g., the user input processor 322) receives user-specified weights corresponding to a low frequency setting, a medium frequency setting, and a high frequency setting, such settings being specified using, for example, the edit box 522, the edit box 524, and the edit box 526 depicted in FIG. 5. In at least one embodiment, the data received further includes a bump map corresponding to an additional texture image, the bump map having unknown user-specified weights. In this case, the image map generator 102 estimates the user-specified weights that would have been required to generate the bump map from the additional texture image. If the texture image and a bump map are received, the shading image S is computed and a Gaussian pyramid constructed. To estimate the weights required to generate a bump map, the image map generator 102 minimizes the following energy function:

$$E(w_k) = \|w_1 P_1 + w_2 P_2 + w_3 P_3 - B\|^2 \text{ such that } w_1 + w_2 + w_3 = 1$$

Where the B is the bump map, $w_1$, $w_2$, and $w_3$ are the weights corresponding to the Gaussian levels $P_1$, $P_2$, and $P_3$. This minimization can be done using a conjugate gradient descent algorithm.

At block 704, the image map generator 102 (e.g., the image derivation engine 326 of FIG. 3) derives a plurality of images from the received texture image from block 702. In at least one example, the derived plurality of images vary from one another with respect to resolution and/or sharpness. For example, the plurality of images are derived from the texture image by constructing a Gaussian pyramid using the texture image as described above in connection with FIGS. 3 and 4. In at least one example, the Gaussian pyramid includes three levels, although any suitable number of levels may be used. In at least one example, image map generator 102 identifies a shading image using the texture image, where the shading image is identified prior to constructing the Gaussian pyramid. Such shading image is identified using a lab color space format or an intrinsic images algorithm as described above.

At block 706, the image map generator 102 (e.g., the image derivation engine 326) applies the user-specified weights to individual images of the plurality of images to generate weighted images. Accordingly, a high value specified for a low frequency setting causes very low contrast components of the texture image to be visible in a resultant bump map. Similarly, a high value in either a medium frequency setting and/or a high frequency setting causes medium and fine contract components (respectively) of the texture image to impact values in the resultant bump map more heavily than if low values are entered.

At block 708, the image map generator 102 (e.g., the bump map generator 328 of FIG. 3) generates a bump map using the weighted images from block 706. In at least one example, image maps corresponding to each level of the Gaussian pyramid are scaled so that each map is of a same size. The image maps corresponding to the levels of the Gaussian pyramid (subsequent to the weighting at block 706) are added together to generate the bump map.

At block 710, the image map generator 102 (e.g., the display manager 318 of FIG. 3) applies, based on the bump map, the texture to the surface of the object to generate the image for display. For example, the bump map provides the texture of the flames on a 3D model as depicted in FIG. 5.

Figure 8:
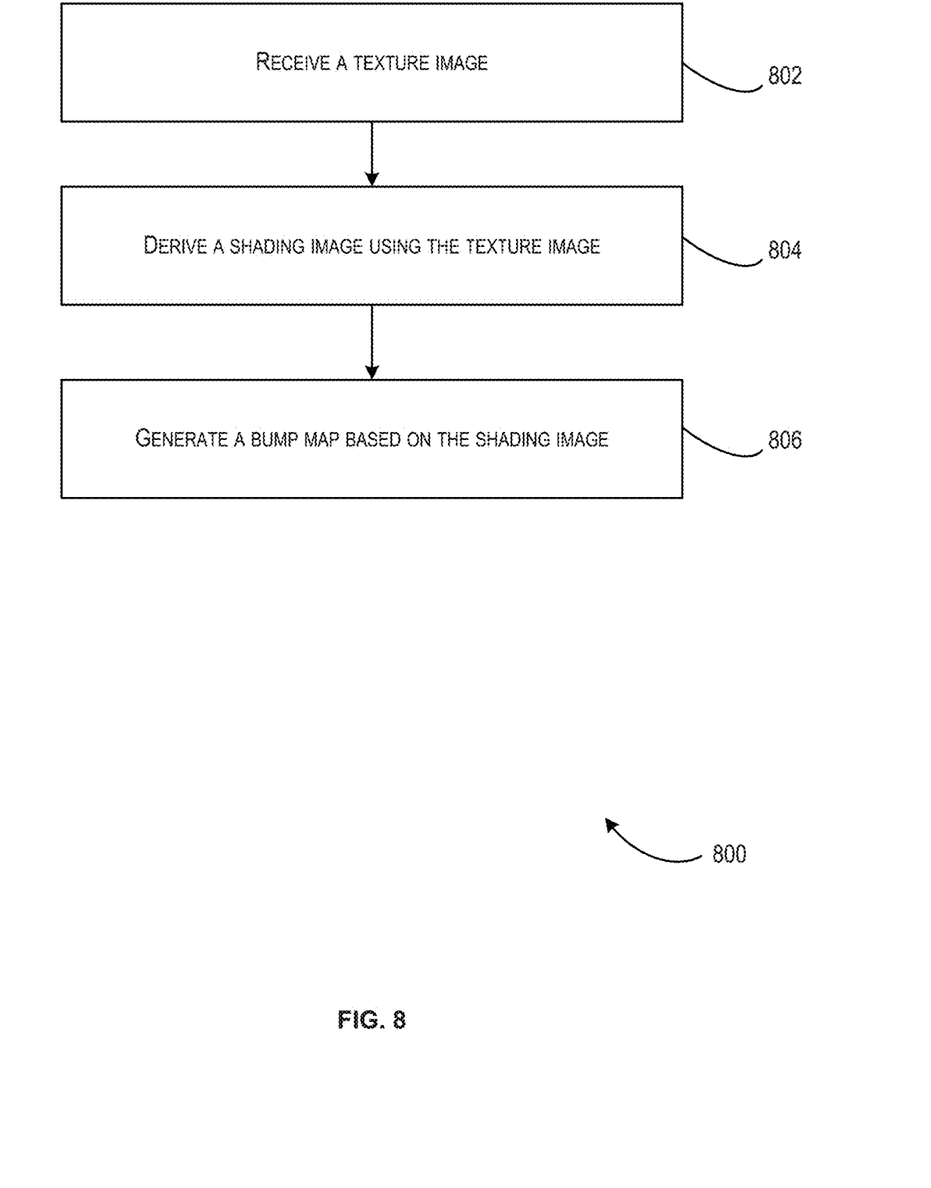
FIG. 8 is a flow chart depicting an example of an algorithm for generating a bump map using a shading image, according to certain exemplary embodiments.

FIG. 8 is a flow chart depicting an example of an algorithm 800 for generating a bump map using a shading image, according to certain exemplary embodiments. In some embodiments, the operations depicted in FIG. 8 are implemented by using one or more processing devices to execute suitable program code. The program code includes the image map generator 102 and is thereby configured to perform the operations described herein. For illustrative purposes, the algorithm 800 is described using the implementations described above with respect to FIGS. 1-7. Other implementations, however, are possible.

At block 802, the image map generator 102 receives a texture image. For example, the texture image includes the texture image 604 (scratches and bumps) depicted in FIG. 6, although the texture image may be any suitable image (e.g., one stored as part of a catalog of images). In at least one embodiment, the image map generator 102 (e.g., the user input processor 322 of FIG. 3) receives the texture image.

At block 804, the image map generator 102 (e.g., the shading image generator 324 of FIG. 3) derives a shading image using the texture image. For example, the texture image can be converted by the shading image generator 324 into lab color space format. A luminance coordinate associated with the converted image (e.g., the L coordinates corresponding to each pixel of the image) is identified. In this example, the shading image is the luminance coordinate.

At block 806, the image map generator 102 (e.g., the bump map generator 328 of FIG. 3) generates a bump map based on the shading image. At block 808, based on the bump map, a texture is applied to the surface of the object to generate an image for display.

In at least one embodiment, the blocks 702-710 included in the algorithm 700 and the blocks 802-806 in the algorithm 800 are combined in any suitable order.

Exemplary Computing Environment

Figure 9:
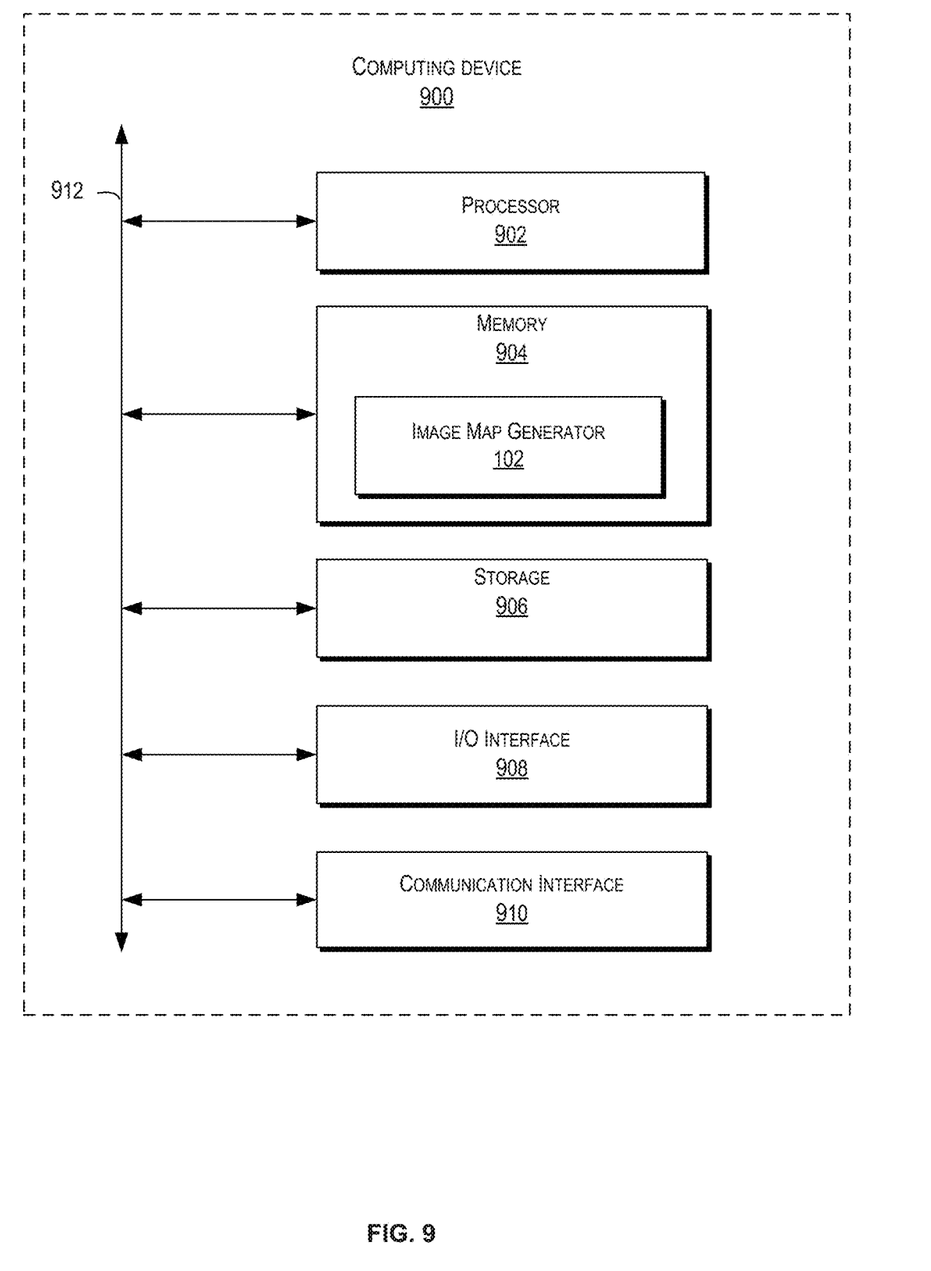
FIG. 9 is a block diagram depicting an example of a computing system that executes the image map generator for enforcing usage policies for data according to certain exemplary embodiments.

Any suitable computing system or group of computing systems can be used to implement the techniques and methods disclosed herein. For example, FIG. 9 is a block diagram depicting examples of implementations of such components. The computing device 900 can include a processor 902 that is communicatively coupled to a memory 904 and that executes computer-executable program code and/or accesses information stored in the memory 904 or storage 906. The processor 902 comprises a microprocessor, an application-specific integrated circuit ("ASIC"), a state machine, or other processing device. The processor 902 includes one processing device or more than one processing device. Such a processor includes or is in communication with a computer-readable medium storing instructions that, when executed by the processor 902, cause the processor to perform the operations described herein.

The memory 904 and storage 906 can include any suitable non-transitory computer-readable medium. The computer-readable medium includes any electronic, optical, magnetic, or other storage device capable of providing a processor with computer-readable instructions or other program code. Non-limiting examples of a computer-readable medium include a CD-ROM, a DVD, a magnetic disk, memory chip, ROM, RAM, an ASIC, a configured processor, optical storage, magnetic tape or other magnetic storage, or any other medium from which a computer processor can read instructions. The instructions include processor-specific instructions generated by a compiler and/or an interpreter from code written in any suitable computer-programming language, including, for example, C, C++, C#, Visual Basic, Java, Python, Perl, JavaScript, and ActionScript.

The computing device 900 also comprises a number of external or internal devices such as input or output devices. For example, the computing device 900 is shown with an input/output ("I/O") interface 908 that can receive input from input devices or provide output to output devices. A communication interface 910 is also included in the computing device 900 and can include any device or group of devices suitable for establishing a wired or wireless data connection to one or more data networks. Non-limiting examples of the communication interface 910 include an Ethernet network adapter, a modem, and/or the like. The computing device 900 transmits messages as electronic or optical signals via the communication interface 910. A bus 912 is also included to communicatively couple one or more components of the computing device 900.

The computing device 900 executes program code that configures the processor 902 to perform one or more of the operations described above. The program code includes one or more modules. For example, the program includes the image map generator 102 or other suitable engine, module, or application that can be used to generate a bump map and/or a normal map from a texture image. The program code is resident in the memory 904, storage 906, or any suitable computer-readable medium and executed by the processor 902 or any other suitable processor. In some embodiments, modules are resident in the memory 904. In additional or alternative embodiments, one or more modules are resident in a memory that is accessible via a data network, such as a memory accessible to a cloud service.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure the claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

The invention claimed is:

1. A method for generating a bump map based on a texture image and user-specified weights to apply a texture to a surface of an object in an image, the method comprising:
   receiving, by a processor, the texture image and a plurality of user-specified weights;
   deriving, by the processor, a plurality of images from the texture image, wherein the plurality of images vary from one another with respect to resolution or sharpness;
   applying, by the processor, the plurality of user-specified weights to individual images of the plurality of images to generate weighted images;
   generating, by the processor, a bump map based on the weighted images; and
   applying, based on the bump map, the texture to the surface of the object to generate the image for display.

2. The method of claim 1, wherein deriving the plurality of images from the texture image comprises constructing a Gaussian pyramid based on the texture image, said constructing including:
   assigning the texture image to a first level of the Gaussian pyramid;
   scaling the texture image to produce a second texture image, wherein the second texture image comprises a second resolution that is less than an initial resolution of the texture image, and where the second texture image is less sharp than the texture image;
   assigning the second texture image to a second level of the Gaussian pyramid;
   scaling the second texture image to produce a third texture image, wherein the third texture image comprises a third resolution that is less than the second resolution of the second texture image, and wherein the third texture image is less sharp than the second texture image;
   assigning the third texture image to a third level of the Gaussian pyramid; and
   associating a user-specified weight of the user-specified weights to each of the first level, the second level, and the third level of the Gaussian pyramid, respectively, wherein the user-specified weights specify an amount that the texture image, the second texture image, and the third texture image influence the generated bump map.

3. The method of claim 1, further comprising:
   generating a normal map from the bump map; and
   applying the texture to the surface based on the normal map to generate the image for display.

4. The method of claim 1, further comprising providing a user interface for receiving the user-specified weights associated with a plurality of levels of a Gaussian pyramid depicting the plurality of images, wherein each level of the Gaussian pyramid represents an image of the plurality of images.

5. The method of claim 1, further comprising identifying a shading image using the texture image, wherein the plurality of images are derived from the shading image.

6. The method of claim 1, further comprising identifying a shading image using the texture image, wherein identifying the shading image comprises:
converting the texture image to a lab color space format;
identifying a luminance coordinate associated with the converted image, wherein the shading image comprises the luminance coordinate.

7. The method of claim 1, further comprising identifying a shading image using the texture image and an intrinsic images algorithm, wherein the plurality of images are derived from the shading image and wherein identifying the shading image comprises using the intrinsic images algorithm to determine an estimated shading image and identifying the shading image based on the estimated shading image.

8. The method of claim 1, wherein an individual image of the plurality of images is smaller in size, and includes a lower amount of tonal variation between rows or columns of pixels of the image than the texture image.

9. The method of claim 1, wherein the plurality of images are derived using a non-edge preserving filter or an edge-preserving filter, wherein the non-edge preserving filter comprises a Gaussian filter, and wherein the edge-preserving filter comprises a Bilateral filter.

10. The method of claim 1, further comprising scaling the individual image to a size associated with the shading image, wherein the scaling occurs prior to generating the bump map.

11. The method of claim 1, further comprising identifying a shading image using the texture image, wherein the shading image includes higher frequency details of the texture image, and wherein other images of the plurality of images include correspondingly lower frequency details of the texture image, wherein a frequency detail of the shading image or the images of the plurality of images corresponds to an amount of tonal variation between rows or columns of pixels of the shading image or the images.

12. The method of claim 1, further comprising:
identifying a shading image using the texture image; and
suppressing noise of the shading image using a Gaussian filter.

13. The method of claim 1, further comprising constructing a normal map from the bump map by deriving horizontal and vertical gradients of the bump map.

14. A method for generating a bump map based on a texture image to apply texture to a surface of an object in an image, the method comprising:
receiving, by a processor, the texture image;
deriving, by the processor, a shading image based on the texture image, said deriving including:
converting the texture image to a lab color space format; and
identifying a luminance coordinate associated with the converted image, wherein the shading image comprises the luminance coordinate;
generating, by the processor, a plurality of images based on the shading image, wherein the plurality of images vary from one another with respect to frequency, wherein a frequency of an image corresponds to an amount of tonal variation between rows or columns of pixels in the image;
generating a bump map based on the shading image and an image of the plurality of images; and
applying, based on the bump map, the texture to the surface of the object to generate the image for display.

15. The method of claim 14, further comprising:
identifying one or more user-specified weights, wherein individual weights of the one or more user-specified weights correspond a low frequency image component of the texture image, a medium frequency image component of the texture image, or a high frequency image component of the texture image, respectively;
deriving, by the processor, a plurality of images from the texture image, wherein the plurality of images are derived based on a Gaussian pyramid; and
applying, by the processor, the user-specified weights to individual images of the plurality of images to generate weighted images, wherein a frequency of an image component of the texture image corresponds to an amount of tonal variation between rows or columns of pixels in the image component.

16. The method of claim 15, wherein the one or more user-specified weights are associated with a predetermined set of weights.

17. The method of claim 15, wherein the one or more user-specified weights are identified by:
receiving an additional bump map with unknown user-specified weights; and
determining values for the unknown user-specified weights based on the additional bump map and the texture image.

18. A system for generating a bump map based on a texture image and user-specified weights to apply texture to a surface of an object in an image, the system comprising:
a processor; and
a non-transitory computer-readable medium communicatively coupled to the processor,
wherein the processor is configured for executing program code stored in the non-transitory computer-readable medium and thereby performing operations comprising:
receiving a texture image and a plurality of user-specified weights;
deriving a shading image using the texture image;
deriving, a plurality of images from the shading image, wherein the plurality of images vary from one another with respect to resolution or sharpness;
applying the plurality of user-specified weights to individual images of the plurality of images to generate weighted images;
generating a bump map using the weighted individual images; and
applying, based on the bump map, the texture to the surface of the object to generate the image for display.

19. The system of claim 18, wherein the processor is further configured to derive a shading image using the texture image by performing operations comprising:
converting the texture image to a lab color space format; and
identifying a luminance coordinate associated with the converted image, wherein the shading image comprises the luminance coordinate.

20. The system of claim 18, wherein the processor is further configured to perform operations comprising generating a normal map based on the bump map.

* * * * *